June 13, 1933. W. WHITELEY 1,913,620
LUBRICATION OF SPINNING AND DOUBLING SPINDLES
Filed Aug. 19, 1931

W. Whiteley
INVENTOR
By Mark H Clark
ATTYS

Patented June 13, 1933

1,913,620

UNITED STATES PATENT OFFICE

WILFRED WHITELEY, OF WOODSIDE, ELLAND, ENGLAND, ASSIGNOR OF ONE-HALF TO JOSEPH HIGGINSON, OF STOCKPORT, ENGLAND

LUBRICATION OF SPINNING AND DOUBLING SPINDLES

Application filed August 19, 1931, Serial No. 558,176, and in Great Britain August 23, 1930.

Spinning and doubling spindles of the type to which this invention relates comprise a spindle holder surrounding a tube (supported by the holder and capable of articulation movements therein) which provides a journal bearing and a footstep or an equivalent supporting bearing for the spindle. Oil is placed in the spindle holder and passes into the tube through suitable holes to lubricate the spindle bearings. It is the duty of the machine attendant to replenish the oil in the spindle holders at stipulated times. In practice, it is found that the lubrication of the spindle at high speeds is often not very satisfactory and also that with some spindles, the upper bearing may be unlubricated if the oil in the spindle holder is not maintained at a high level or under certain conditions of drive. Inefficient lubricating conditions due to any causes, such as failure to maintain the oil level in the holders, unsatisfactory lubricant or lubricant which has become contaminated, results in heavy running of the spindles and other unsatisfactory conditions of service. As the conditions may vary in the different spindles of a machine, replenishment of the lubricating oil at fixed intervals of time does not ensure good running conditions for all the spindles.

The object of the present invention is to provide improved lubricating means for spinning and doubling spindles of the type specified, such means obviating the necessity of attention to individual spindles for cleaning or for lubricant replenishment purposes and ensuring light running of the spindles with efficient lubrication with clean oil at all times.

The invention consists in the delivery of lubricating oil to each spindle holder under pressure and the arrangement of means preventing the flow of lubricant along the tube exterior and permitting it to enter said tube to counterbalance the weight of the spindle in the holder and so ensure light running.

The invention further consists in the provision of means limiting the rate of flow of lubricating oil into the spindle holder from the pressure supply system for the purpose hereinafter specified.

The invention further consists in the provision of a narrow resilient jointing ring between the tube and the holder to prevent the flow of oil along the tube exterior.

The invention further consists in arranging the wharve to seat upon the top of the tube, the pressure of the lubricating oil tending to raise the wharve from said tube.

The invention will now be described with reference to the accompanying drawing, in which:—

Similar letters refer to similar parts throughout the drawing.

Figures 1, 2:
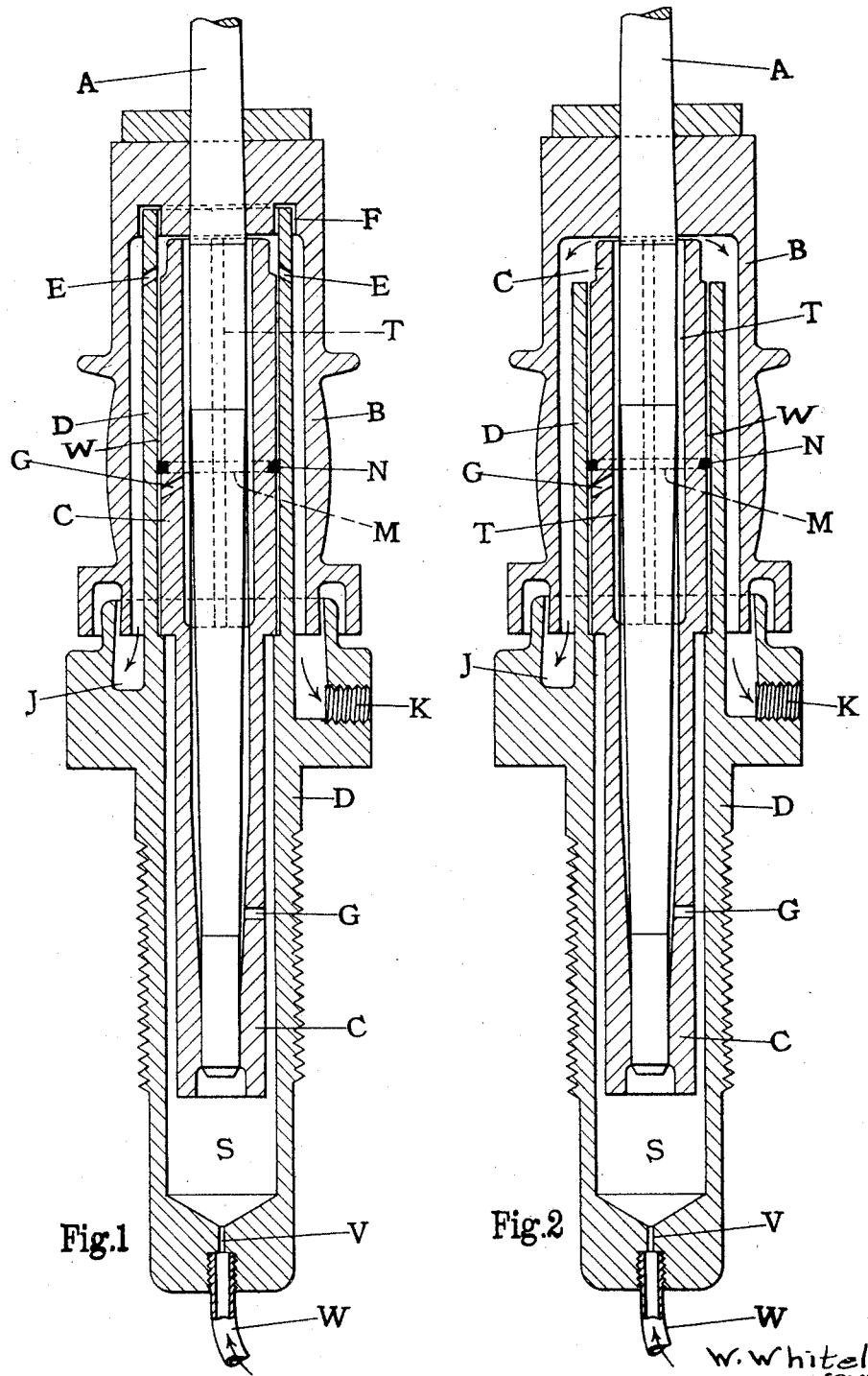
Figure 1 is a sectional elevation of a spindle and a spindle holder of the type specified constructed in one convenient form in accordance with this invention.
Figure 2 is a sectional elevation of a spindle and spindle holder of the type specified constructed in another convenient form in accordance with this invention.

A indicates the spindle, B the wharve upon the spindle, C the tube and D the spindle holder. The tube is capable of oscillatory or articulation movements in the holder due to the provision of small clearance, indicated to an exaggerated extent at W in order to ensure smooth running of the spindle.

It will be noted that the usual type of footstep bearing for the spindle within the tube is dispensed with and that the spindle and wharve are adapted to be supported on the upper end of the tube C where the interior of the wharve seats upon the tube and acts as a valve to prevent the free flow of lubricant from the interior of the tube. The top of the spindle holder may project into a recess F in the wharve and holes E be provided in the holder to allow lubricating oil which may have passed the seating surface between wharve and tube to pass down the outside of the spindle holder to the space J and so to the outlet branch K where a connection may be made to the suction side of the pump delivering the lubricant under pressure to the tube W at the base of the spindle holder.

A groove is formed at M in the peripheral surface of the tube C and a resilient ring N is placed in said groove to prevent lubricant passing from the well S in the spindle holder along the exterior of the tube. Such ring which may, for example, be made of india-rubber, does not interfere with the free oscillatory movements of the tube to give smooth spindle running.

The lubricant is supplied to the spindle holder through an aperture V of restricted bore so that should the spindle be removed from the tube, there will be but a relatively slow rate of oil escape which will not interfere with the proper lubrication of the other spindles connected to the same source of supply of lubricant under pressure. G is a hole affording direct communication between the oil well S and the space around the tapered part of the spindle.

In the arrangement shown in Figure 2, the spindle holder does not project above the tube C as in the Figure 1 arrangement, allowing the lubricating medium which may have passed the seating surface aforesaid to pass down the inside of the wharve.

In order to prevent undue lifting of the spindle due to the oil pressure, there is provided suitable means for relieving or releasing the pressure upon the spindle after it has risen to a certain extent. In Figures 1 and 2, grooves T are provided which extend down the tube C to a point at which they will have their lower ends opened to the pressure of the oil in the space around the tapered part of the spindle. Immediately the spindle and wharve are lifted off their seat on the top of the inner tube further increase of pressure ceases; the lubricant being allowed to pass freely through the grooves T prevents further lifting of the spindle.

With these improvements, the pressure of the lubricant is adjusted to effect any desired degree of counter-balancing of the weight of the spindle and wharve and the bobbin and yarn to be wound thereon. There is always a slow rate of flow of oil past the seating surface between wharve and tube and as the oil is filtered before it is returned to the spindle holder, there is always a full supply of clean oil in the spindle holder which not only ensures efficient lubrication of the spindle journal bearings but also supports any desired proportion of the weight of and on the spindle so that friction is reduced to a minimum.

What I claim is:—

1. A spinning or doubling spindle comprising, in combination, a spindle holder, a tube capable of articulation movements within said holder, a spindle, a wharve upon said spindle, a bearing upon the upper end of said tube supporting said spindle and wharve, the bearing surfaces acting in conjunction as a valve to prevent the free flow of the spindle lubricant from within the tube, journal bearings for the spindle in the tube, means supplying lubricant under pressure to the holder and through it to the interior of the tube for lubricating the journal bearings, means in the holder collecting lubricant overflowing between the bearing surfaces of spindle and wharve and tube, and resilient means between the tube and holder preventing the flow of lubricant along said parts whilst allowing the articulation movements of the tube.

2. In spinning and doubling spindles as claimed in claim 1, the provision of means limiting the rate of flow of lubricant into the spindle holder from the pressure supply system for the purpose described.

3. In spinning and doubling spindles, as claimed in claim 1, a narrow india-rubber ring between the tube and holder acting as the resilient means which prevent the flow of lubricant along the tube exterior.

4. In spinning and doubling spindles as claimed in claim 1, the provision of means relieving the lubricant pressure on the spindle when the latter rises above a predetermined amount.

5. In spinning and doubling spindles as claimed in claim 1, the provision of grooves in the tube around the spindle to relieve the lubricant pressure when the spindle rises.

In testimony whereof I have signed my name to this specification.

WILFRED WHITELEY.